United States Patent [19]
Thelen

[11] Patent Number: 5,262,618
[45] Date of Patent: Nov. 16, 1993

[54] HEAT/PROCESS CONTROL
[75] Inventor: Brian L. Thelen, Fond du Lac, Wis.
[73] Assignee: Nigrelli Systems, Inc., Kiel, Wis.
[21] Appl. No.: 822,192
[22] Filed: Jan. 17, 1992
[51] Int. Cl.$^5$ .............................................. H05B 1/02
[52] U.S. Cl. .................... 219/486; 219/388; 219/483; 219/497; 219/506
[58] Field of Search ............... 219/388, 483, 485, 497, 219/486, 501, 494, 506, 10.55 R

[56] References Cited
U.S. PATENT DOCUMENTS

| 4,087,568 | 5/1978 | Fay et al. | 219/588 |
| 4,358,192 | 11/1982 | Goldberg et al. | 219/388 |
| 4,671,757 | 6/1987 | Volk, Jr. | 219/10.55 A |

Primary Examiner—Mark H. Paschall
Attorney, Agent, or Firm—Francis J. Bouda

[57] ABSTRACT

A heat/process control is disclosed which takes advantage of the characteristics of some plastics in that they absorb medium wavelength infra-red heat waves in a comparatively wide range of temperatures (and therefore wavelengths). The heaters used in this equipment are of quartz-tube construction which can be used through a wide temperature range. Tests have indicated that lamp wattage and machine processing speed were mathmatically related. For plastics of different formulation and/or thickness a series of parametric curves exist. Each curve is resident in the machine control and can be incorporated with a simple selector switch. For a given plastic a mathmatical equation relating speed and heater temperature is selected. If an increase in speed is required, the target speed and associated temperature is calculated and then loaded into the controller. Since the heaters cannon respond instantaneously, the heaters are fitted with temperature feedback devices which are used to vary the machine speed in accord with the heater actual temperatures. As the heater temperatures rise, the actual temperature of the heaters is input into an equation which calculates an appropriate increase in machine speed. This correlation of speed and temperature results in the most efficient use of energy because when operating, the machine never used more energy than required at a given operating level.

3 Claims, 4 Drawing Sheets

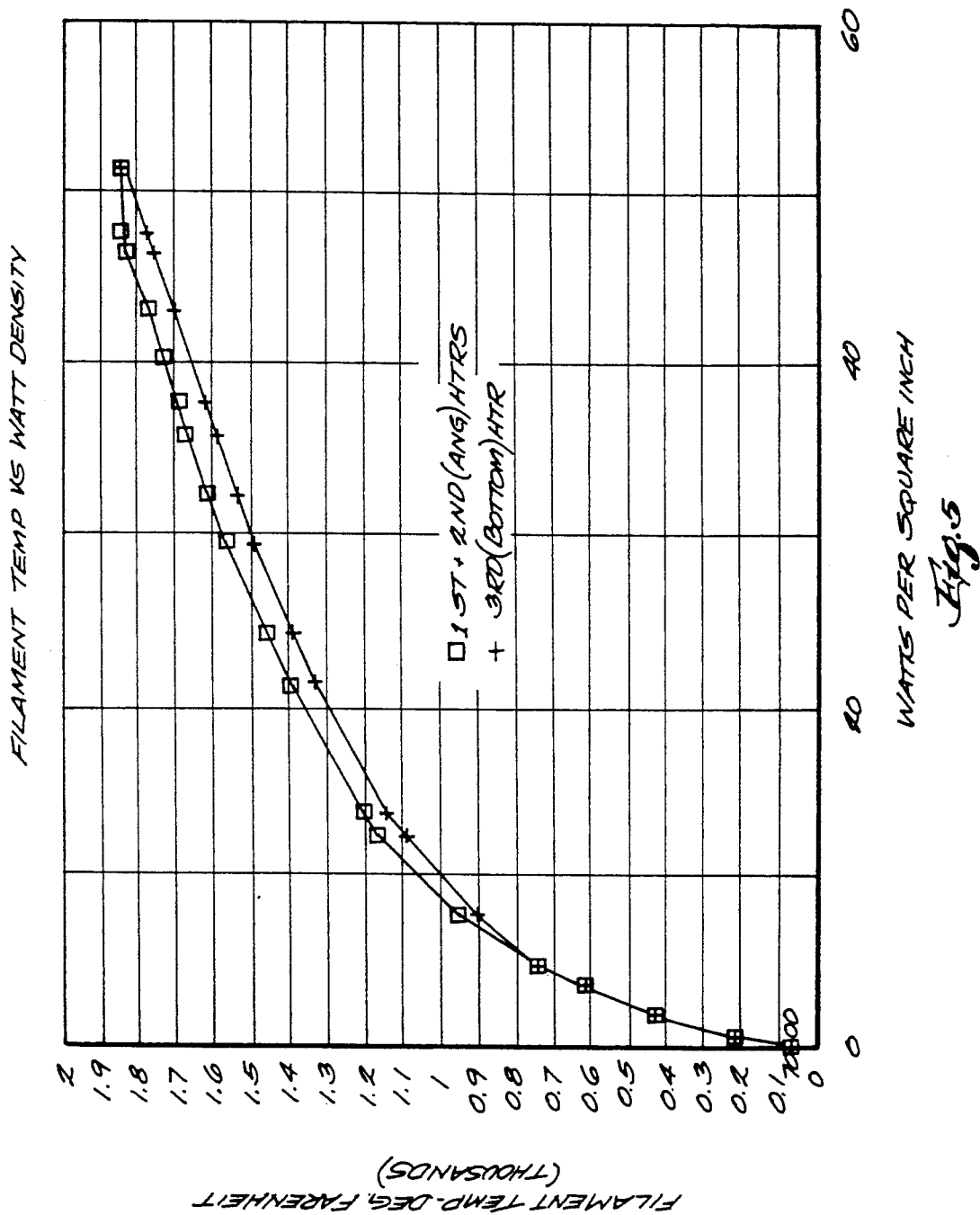

HEAT/PROCESS CONTROL

BACKGROUND OF THE INVENTION

The present invention relates to a process and equipment for carefully and accurately controlling the application of heat to plastic sheets. It even more specifically relates to the heating of plastic sheet material in high-speed packaging equipment, and is quite directly related to the heating of a plastic cover-carrier for a plurality of beverage containers.

It has been found desirable in the packaging of beverage containers, such as bottles or cans of beer and soft drinks, to carefully and accurately heat a sheet of plastic material which is then placed in position on an aligned collection of containers moving rapidly through a processing system.

As an example, in the processing of cans of beer, the brewery may, for example, supply the containers at an output speed of 1200 containers per minute. This discharge speed may range from a low level of 1200 containers per minute to a high level of 3,000 containers per minute.

As these containers are discharged from the "canning plant", they are placed upon a conveyor line which carries them to a packaging unit where they are packaged in trays or cases for delivery.

However, before being packaged, the containers are assembled into "packs" typically from 6 to 12 units each, and each of these "packs" desirably has a plastic carrier or protective cover placed thereover before the containers are placed into the case or tray.

The packaging machine for placing the plastic sheets upon the plurality of containers desirably has an idling speed of 50 cases per minute, but as the containers are discharged from the canning plant, they are directed by the conveyors into the packaging unit at speeds which range from 50 cases (of 24 containers) per minute (equal to the low bottling speed of 1200 containers per minute) up to 125 cases per minute at a top speed.

The speed at which these containers are brought to the packaging unit may vary as much as 1800 containers per minute (75 cases per minute), and in order that the packaging unit operates properly, and particularly that the heating elements therein which act upon the plastic sheets which provide the carrying or protective cover element operate properly, it is necessary to provide a heat/speed process control which has heretofore not been available to the industry.

SUMMARY OF THE INVENTION

To accomplish this, a plurality of heater units (preferably three) are provided in sequence in the packaging unit, and each of these heater units has electrically-heated filaments which operate within a temperature range of approximately ambient to 1800° F.

We have found that by placing these heater units in sequence and carefully controlling the temperature of each, the first heater element is sufficient to heat and control the process if the cases are arriving at the packaging unit at up to 60 cases per minute.

As the speed increases to 110 per minute, the first and the second heater elements are employed, and if the speed increases above 110 cases per minute, a third element is energized to act upon the greater quantity of containers coming into the packaging unit.

It is the function of the process control unit of the present invention to control the heat in the filaments of the heating units so that the proper temperature is applied to the specific plastic being used at that specific time.

In addition, the process control unit of the present invention controls the speed at which the containers are brought into and through the packaging unit so that the appropriate number of containers are present in alignment with the properly-heated plastic sheet, and that the plastic sheet is heated to the proper temperature to be applied to containers brought into the packaging unit at that given speed.

Conversely, the speed of the containers coming to the unit can also control the temperature of the heaters so that if the containers arrive at the packaging unit more swiftly than in the past, not only do the heating filaments heat up to accept that quantity of product, but the second heating unit or the third heating units may be applied as necessary.

Thus the heating unit can control the speed of travel of the containers from the canning plant to the packaging unit; or, conversely, if the speed of such containers on the conveyors changes, it can control the effective heat in the heating units.

Thus the principal object of the present invention is to provide a process control and apparatus for carefully and accurately applying localized heat to a series of plastic sheets which are moving rapidly, but at varying speeds beneath one or more heating units.

A more specific object is to effectively heat plastic cover/carrier elements for multi-pack beverage containers, as the containers move from a filling station to a packaging station.

With the above and other objects in view, more information and a better understanding of the present invention may be achieved by reference to the following detailed description.

DETAILED DESCRIPTION

For the purpose of illustrating the invention, there is shown in the accompanying drawings a form thereof which is at present preferred, although it is to be understood that the several instrumentalities of which the invention consists can be variously arranged and organized and that the invention is not limited to the precise arrangements and organizations of the instrumentalities as herein shown and described.

In the drawings, wherein like reference characters indicate like parts:

FIG. 5 is a graph showing the relative relationship between filament temperature and watt density.

The prior art utilized heated "buttons" in physical contact with the plastic to warm the plastic in each container area. This has the disadvantage of cooling the buttons each cycle. A further disadvantage is that the physical contact during the heat cycle tends negatively to affect the surface of the plastic, causing a clouding of the surface.

This control takes advantage of the characteristics of some plastics, in that they absorb medium wavelength infrared heat waves in a comparatively wide range of temperatures (and therefore wavelengths) (typically from 2.5 to 7.0 microns). The heaters used in this equipment are of quartz-tube construction, which can be used through a wide temperature range. Testing has indicated that lamp wattage (and therefore temperature) and machine processing speed were mathematically related. For plastics of different formulation and/or thicknesses, a series of parametric curves exist. Each curve is resident in the machine control and can be incorporated with a simple selector switch. These curves are shown in FIGS. 4-9. For a given plastic, a mathematical equation relating speed and heater temperature is selected.

If an increase in speed is required, the target speed and associated temperature is loaded into the control. Since the heaters cannot respond instantaneously, the heaters are fitted with temperature feedback devices which are used to vary the machine speed in accord with the heater actual temperatures. As the heater temperatures rise, the temperature of the heaters is input into an equation which calculates an appropriate machine speed.

The reverse is also true, in that when a decrease in speed is indicated, power to the heaters is reduced and the machine speed slows down in accord with the *actual* heater temperatures.

This correlation of speed and temperature results in the most efficient use of energy because, when operating, the machine never uses more energy than required for a given operating level.

When a machine speed is selected, a low, medium, or high speed "enable" sensor upstream sets to "on", an internal relay in the programmable controller. This enables a set point constant to be moved to a desired speed input register. This register is used to set straight line equation values approximating the selected portion of the temperature/speed curve. The equation is of the form $Y = MX + b$. Where: $Y$ = temp. $X$ = speed, $M$ = slope of the curve and $b$ = the Y intercept. These discrete curve approximations are bounded by limits which are examined to set "on" speed ranges which then enable the heater command equations. The desired speed is multiplied by the slope constant. Then the Y intercept value is added to the speed/slope product. This value then becomes the temperature command computed output (setpoint) to the heater controls.

Figure 1:
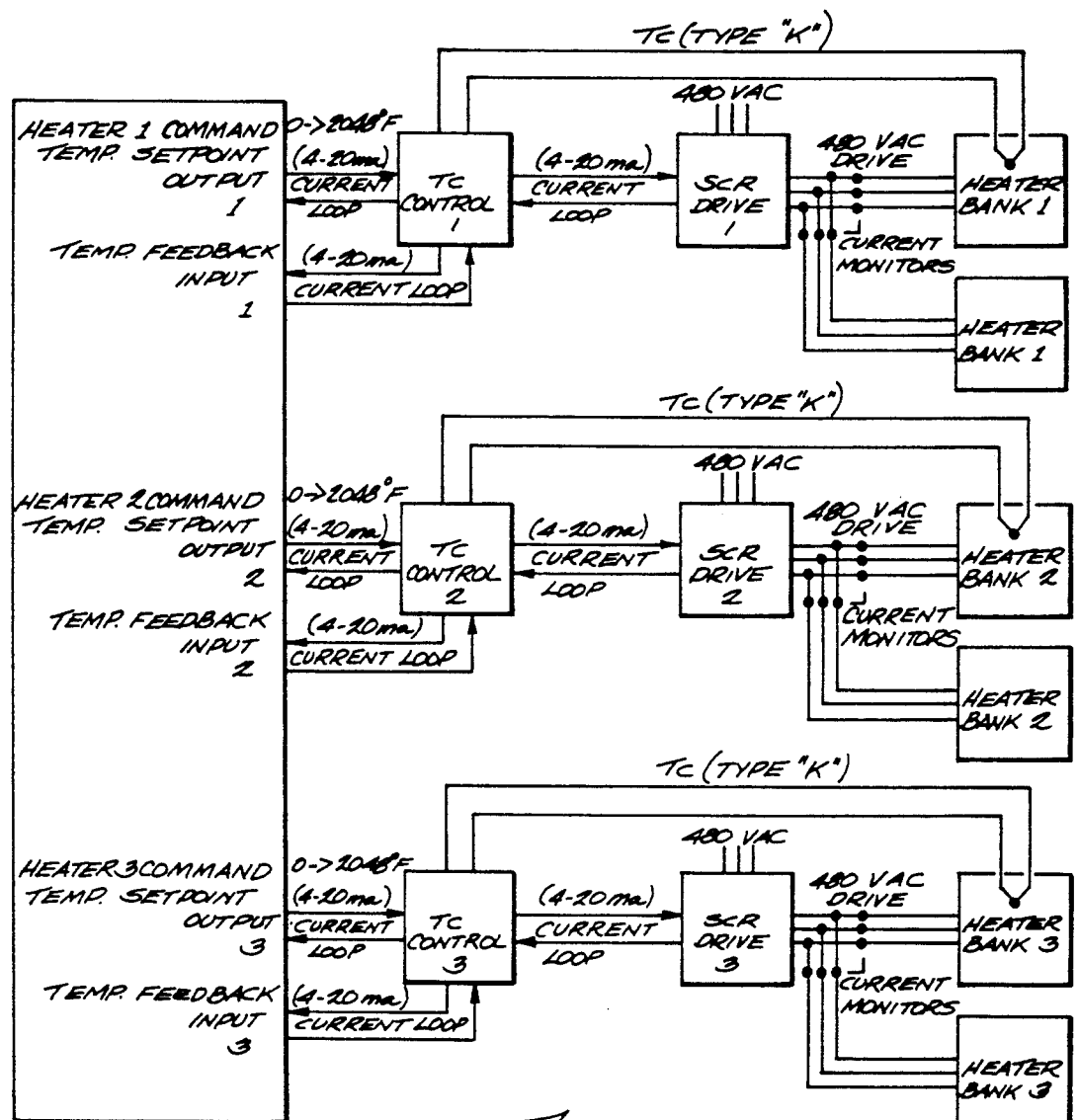
FIG. 1 is a diagrammatic sketch of the sensors, controls, drives, and heater elements of the present invention.
Figure 3:
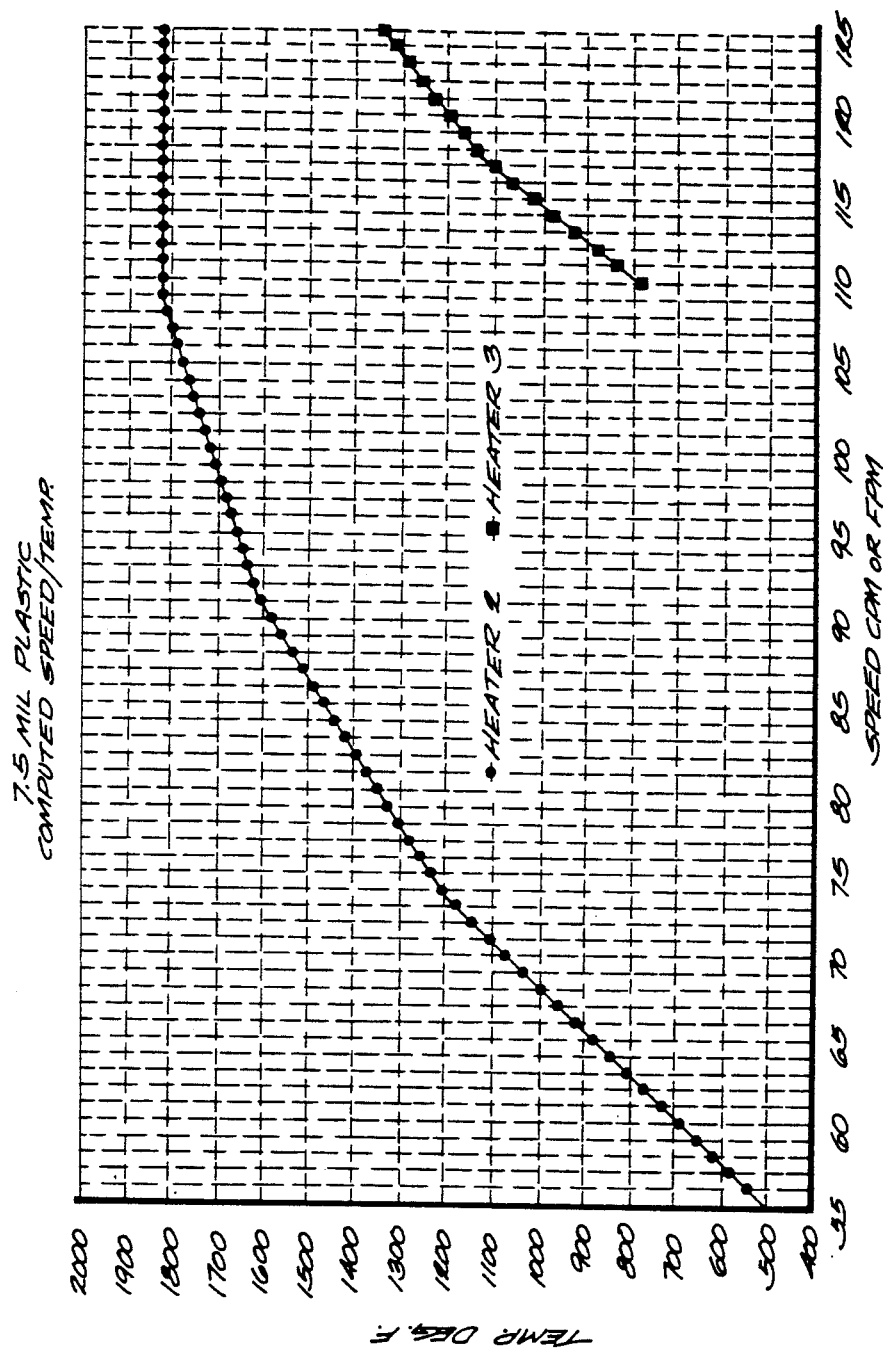
FIG. 3 is a chart of the relative relationship of heater filament temperatures and machine speeds for a plastic sheet of 7.5 mils thickness.
Figure 2:
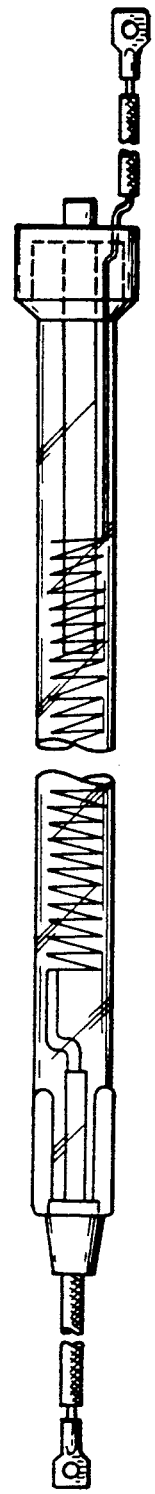
FIG. 2 is a fragmentary cross-sectional view of the combined quartz tube thermocouple and heating element of the heat sensor of the present invention.
Figure 4:
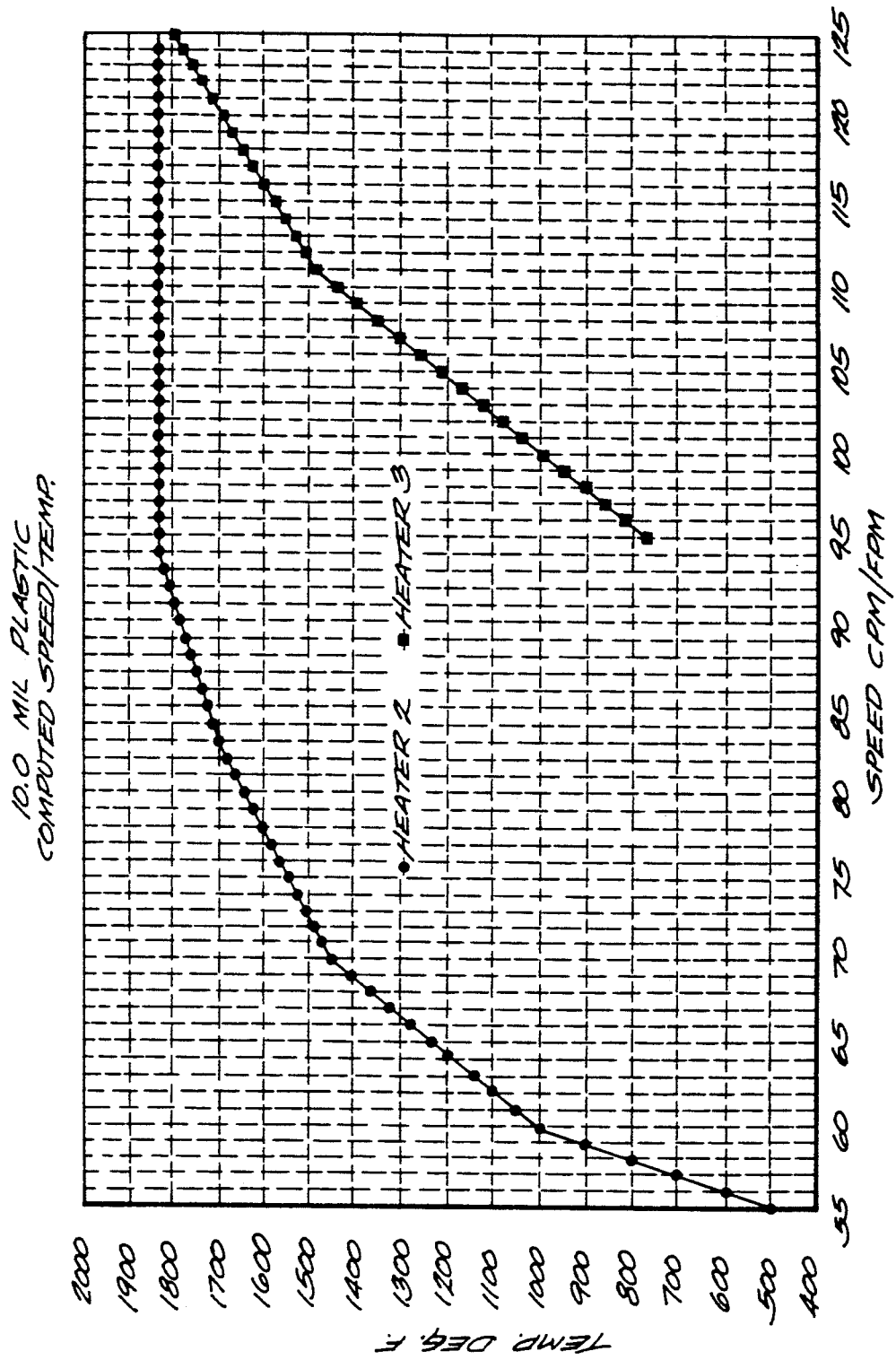
FIG. 4 is a chart similar to FIG. 4 relating to a plastic sheet of 10 mils thickness.

Temperature feedback is provided by thermocouples placed within the heater modules directly. (See FIG. 3.) This feedback is re-transmitted from the controller as a 4-20 milliamp signal and is received as an analog input to the programmable controller. This analog signal is converted to engineering units (measured temperature) and then used to select a temperature range. The range is selected by comparing the minimum value of each range with the measured heater temperature. These temperature limits are examined to set "on" temperature/speed ranges which then are used to calculate the speed command. The speed command computed is then scaled and outputed to the machine's variable speed drive as a 4-20 milliamp speed level signal, matching the machine speed to the actual heater temperature, on a continuous basis.

Thus we have disclosed a new and novel system for controlling the relationship between energy input and time (i.e., watts consumed versus seconds of travel) for the heating and applying of plastic sheets to beverage containers.

It is to be understood that the present invention may be embodied in other specific forms without departing from the spirit or special attributes hereof, and it is therefore desired that the present embodiments be considered in all respects as illustrative, and therefore not restrictive, reference being made to the appended claims rather than to the foregoing description to indicate the scope of the invention.

Having thus described my invention, what I claim as new and desire to protect by Letters Patent are the following:

1. In a process for heating a moving web of material passing through a machine wherein said process utilizes a series of discreet heaters to maintain a fixed and uniform radiation absorption level in the web throughout a wide machine speed range, and process comprising the steps of monitoring the temperature of the heaters, determining the energy radiating from the heating elements in response to said monitoring relating the monitored temperature via the series of contiguous equations to the machine speed (a continuous, and holding constant the amount of energy in the moving web regardless of the speed of the moving web in response to said relating step.

2. In a process for heating a moving web of material passing through a machine wherein said process utilizes a series of discreet heaters to maintain a fixed and uniform radiation absorption level, the web throughout a wide machine speed range, said process comprising the steps of monitoring the temperature of the heaters, determining the energy radiating from the heating elements in response to said monitoring, relating the monitored temperature via a continuous series of contiguous equations to the machine speed;

holding constant the amount of energy in the moving web regardless of the speed of the moving web in response to said relating step and monitoring an increasing temperature of the heaters and thereby smoothly and continuously increasing the machine speed based on the thermo-feedback from the heaters.

3. In a process for heating a moving web of material passing through a machine wherein said process utilizes a series of discreet heaters to maintain a fixed and uniform radiation the web throughout a wide machine speed range, said process comprising the steps of monitoring by reading the temperature of the heaters, determining the energy radiating from the heating elements in response to said monitoring relating the temperature via a continuous series of contiguous equations to the machine speed;

holding constant a amount of energy in the moving web regardless of the speed of the moving in response to said relating step web, and monitoring a decreasing temperature of the heaters in the machine and smoothly and continuously decreasing the machine speed in relation to the actual feedback from the heaters.

* * * * *